STABILIZED OFFSHORE DRILLING APPARATUS
Original Filed March 27, 1967 2 Sheets-Sheet 1
FIG. 2
FIG. 3
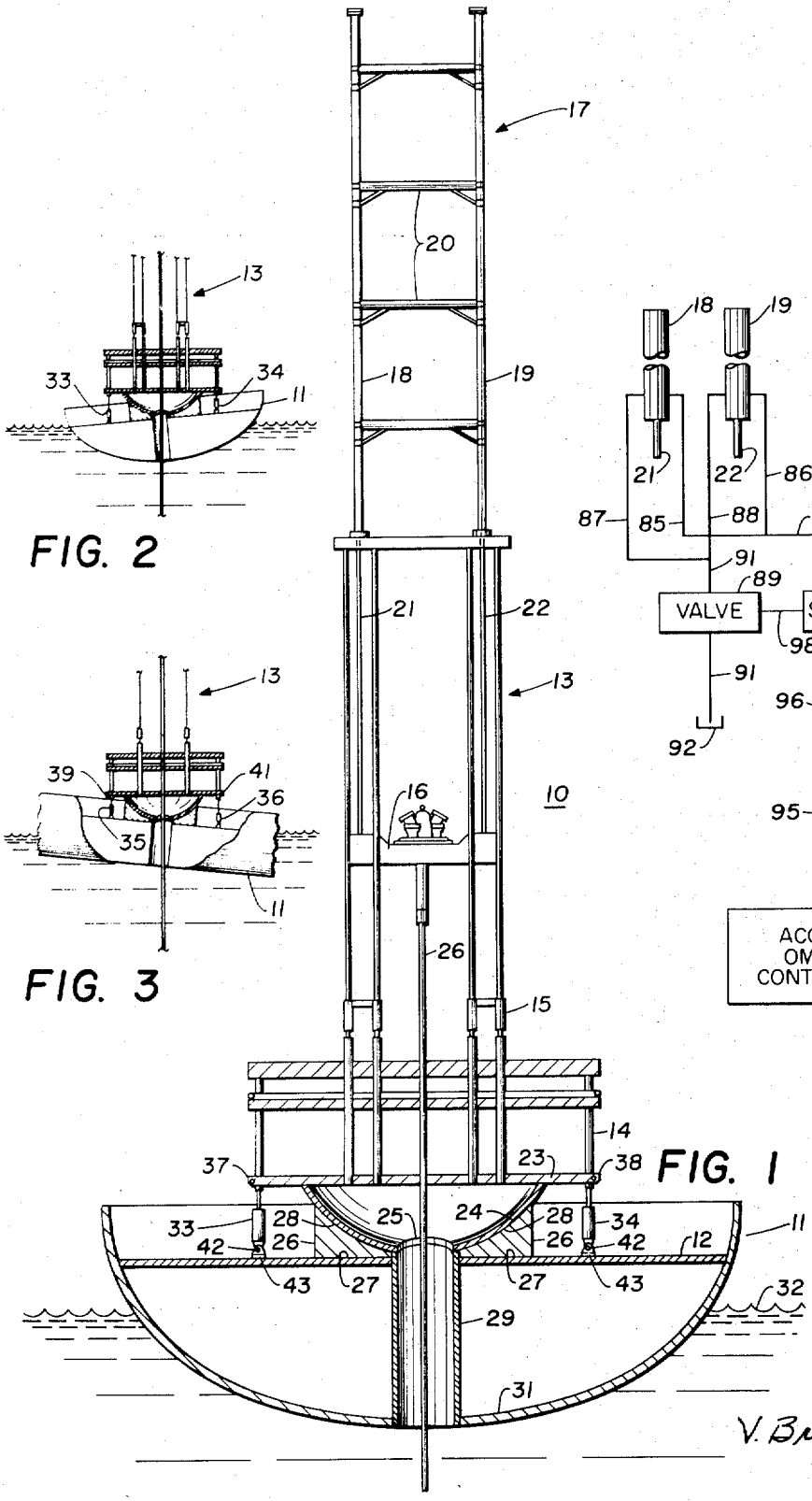
FIG. 1
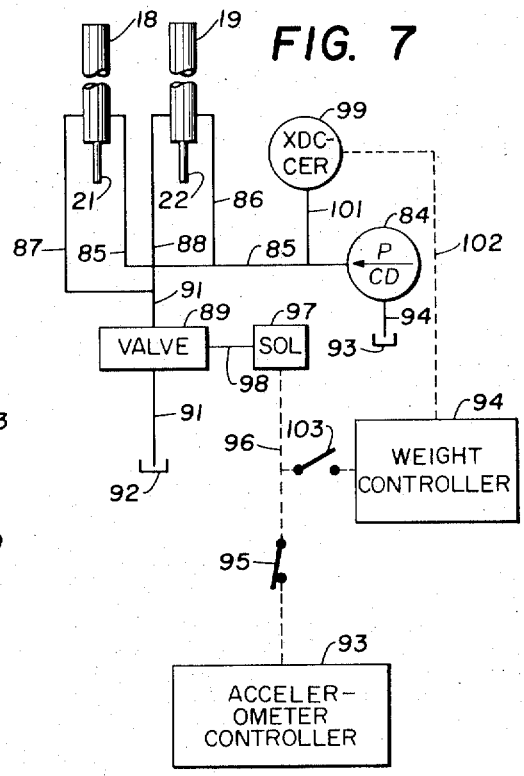
FIG. 7
INVENTORS
RAY. J. BROMELL
MARION D. LACKEY
V. Bryan Medlock, Jr.
ATTORNEY

STABILIZED OFFSHORE DRILLING APPARATUS

Original Filed March 27, 1967 2 Sheets-Sheet 2

INVENTORS
RAY J. BROMELL
MARION D. LACKEY

V. Bryan Medlock, Jr.
ATTORNEY

United States Patent Office

Re. 27,261
Reissued Dec. 28, 1971

27,261

STABILIZED OFFSHORE DRILLING APPARATUS

Raymond J. Bromell and Marion D. Lackey, Dallas, Tex., assignors to Kendrick Cattle Company, Sheridan, Wyo.

Original No. 3,390,654, dated July 2, 1968, Ser. No. 626,091, Mar. 27, 1967. Application for reissue May 11, 1970, Ser. No. 36,192

Int. Cl. B63b *35/00*

U.S. Cl. 114—.5 13 Claims

Matter enclosed in heavy brackets [ ] appears in the original patent but forms no part of this reissue specification; matter printed in italics indicates the additions made by reissue.

ABSTRACT OF THE DISCLOSURE

An offshore drilling apparatus mounted on a floating vessel so that the vessel can both roll and pitch relative to the drilling apparatus. Roll and pitch sensors, in response to movements of the vessel, actuate a plurality of hydraulic cylinder and rod assemblies disposed about the periphery of the base of the drilling apparatus to maintain the drilling string in a vertical position during pitch and roll of the vessel. The pitch and roll compensating means act in combination to compensate for simultaneous pitch and roll of the vessel. The drilling apparatus includes hydraulic cylinder and rod means for suspending the drill string through the bottom of the vessel and means are provided for compensating for vertical movement of the floating vessel to maintain the drill string in a relatively fixed position relative to the earth.

Field of the invention

The invention relates to earth boring apparatus, and more particularly to offshore earth boring apparatus which are mounted on a floating vessel.

The prior art

Conventional offshore drilling is usually performed from a platform fixed to the bottom of the ocean or from a floating vessel upon which the drilling apparatus is mounted. When drilling is to be done in an offshore area which is relatively shallow, fixed platforms are usually suitable for the drilling; but when drilling is to be done in relatively deep water, the construction of a platform which may be affixed to the bottom of the sea becomes quite expensive and is extremely difficult to transport to the drilling location. Therefore, for drilling in relatively deep water, floating vessels are usually employed. Various problems are encountered in drilling from a floating vessel during turbulent sea conditions. When the sea becomes turbulent, the vessel upon which the drilling apparatus is mounted begins to pitch and roll, as well as move vertically. During the pitching and rolling movement of the vessel, bending stresses are created in the drill string. During vertical movement of the vessel, the drill bit or the like is either lifted from the bottom of the hole being drilled, or alternatively, the drill string to which the bit is attached is subject to compressive stresses which can shear the string. For example, if the drill bit is in contact with the bottom of the bore hole at one elevation of the drilling vessel and the vessel moves upwardly, the drill bit will be lifted from the bottom of the bore hole, during which time rotation of the drill bit is ineffective to drill a hole. If the vessel moves downwardly, the drill string is placed in compression, placing excessive weight on the drill bit and the string to which it is attached; and excessive weight can damage both the bit and the drill string.

Also, in certain drilling applications, it becomes necessary to attach blow-out preventers and well completion equipment to the ocean floor. Such equipment must be suspended from the drilling apparatus mounted on the vessel, and movement of the vessel relative to the ocean floor can render difficult the location of equipment over a bore hole. All of the above problems have been appreciated by the prior art, and various attempts have been made at stabilizing the drilling apparatus, as well as compensating for the movement of the apparatus. For example, very expenseive slip joints have been devised to compensate for vertical movement of the drill string. These slip joints are subject to extreme wear and often fail in service.

Other efforts to solve the above problems are exemplified by the following U.S. Letters Patents: 2,945,676, 3,158,208, 3,158,206, 2,777,669, and 3,208,728.

Summary

This invention may be generally described as an offshore drilling apparatus including a vessel which supports a mast and carries means for supporting lowering, raising and rotating a drill string adapted to be inserted into the earth below, which includes the improvement of means for mounting the mast to the vessel so that the vessel can roll and pitch relative to the mast. First sensing means are provided for sensing the roll of the vessel and generating an outlet signal when the vessel rolls relative to the horizontal. First stabilizing means are responsive to the signal from the first sensing means for maintaining the mast in a vertical position during rolling movement of the vessel. Second sensing means are provided for sensing the pitch of the vessel and generating an output signal when the vessel pitches relative to the horizontal. Second stabilizing means are responsive to the signal from the second sensing means for maintaining the mast in a vertical position during pitching movement of the vessel. Third sensing means, which are responsive to vertical movement of the vessel, generate a signal upon vertical movement of the mast for actuating third stabilizing means which serves to maintain the drill string in a predetermined position upon vertical movement of the vessel.

The drawings:

FIGURE 1 is a front elevational view, partially cross sectioned, of one embodiment of the present invention, with the sensing and stabilizing elements omitted for ease of illustration;

FIGURE 2 is a view similar to FIGURE 1 to illustrate the relative position of the vessel and drilling apparatus, when the vessel has rolled relative to the drilling apparatus;

FIGURE 3 is a side elevational view, partially cutaway, of the FIGURE 1 embodiment illustrating the relative position of the drilling apparatus and mast when the vessel has pitched relative to the drilling apparatus;

FIGURE 7 is a schematic illustration of the sensing and stabilizing means employed to compensate for vertical movement of the vessel and drilling apparatus.

The preferred embodiments

Figure 5:
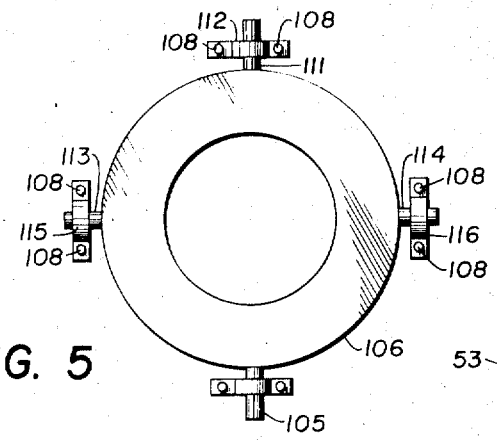
FIGURE 5 is a top plan view of the mounting means illustrated in FIGURE 4.

With reference to FIGURE 1, the offshore drilling apparatus 10 includes a vessel 11 provided with a top deck 2 which supports a drilling rig 13. Drilling rig 13 includes multi-level platform 14 which supports a mast 15 within which is slidably carried a vertically moveable drillhead assembly 16. Drillhead assembly 16 is threadably engaged with and supports a drill string 26. Movement of drillhead 6 relative to mast 15 is accomplished by a suitably braced tower 17 fixed to the top of mast 15. Tower 17 includes cylinders 18 and 19 which are suitably braced by struts 0. Rods 21 and 22, which are reciprocally mounted with cylinders 18 and 19, respectively, are affixed to drillhead 6 at their lower end and serve to effect vertical movement of drillhead 16 upon introduction of hydraulic fluid into cylinders 18 and 19 through hydraulic lines not illustrated in FIGURE 1). Attached to base 23 of platform 14 is a semi-spherical shell 24 which is provided with an opening 25 through which is suspended drill string 26. Shell 24 is supported upon deck 12 of vessel 1 by a plurality of vertical plates 26 which are affixed at their bottom edge 27 to deck 12 and are provided at their upper edge 28 with arcuate surfaces adapted to mate with the shell 24. Passing interiorly of plates 26 and extending through deck 12 is a housing 29 which also passes through the bottom 31 of vessel 11 and is secured thereto in a watertight relationship by any suitable means. Housing 29 permits drill string 26 to pass therethrough, out through the bottom of vessel 11 and through the sea 32 to permit drilling through the earth's crust (not illustrated).

In drilling from a floating vessel it is desirable to maintain the drill string 26 in a relatively stationary vertical position in order to maintain a fixed weight on the bit and to prevent creating stresses in the string 26 which would arise if the sea 32 causes rolling pitching movement of vessel 11. To insure that the drilling rig 13 is maintained in a relatively vertical position during movement of vessel 11 under the influence of the sea 32, means are provided for sensing the movement of vessel 11 and in response to such movement actuating hydraulic means for maintaining drilling rig 13 in the relatively vertical position. Specifically, disposed between base 23 and deck 12 are a plurality of hydraulic cylinder-rod assemblies 33–36. Hydraulic cylinder-rod assembly 33 is attached to base 23 at approximately the midpoint of edge 37 and cylinder and rod assembly 34 is attached to base 23 at the midpoint of its opposite edge 38. As illustrated in FIGURE 3, cylinder and rod assembly 35 is attached to base 23 proximate the midpoint of edge 39 and cylinder and rod assembly 36 is attached to base 23 proximate the midpoint of edge 41. The cylinder portions of each of hydraulic cylinder and rod assemblies 33–36 is attached by a pin 42 to a clevis 43 which is in turn secured to deck 12 of vessel 11. Pins 42 and clevis 43 permit pivotal movement of hydraulic cylinder and rod assemblies 33–36 relative to deck 12.

Figure 6:
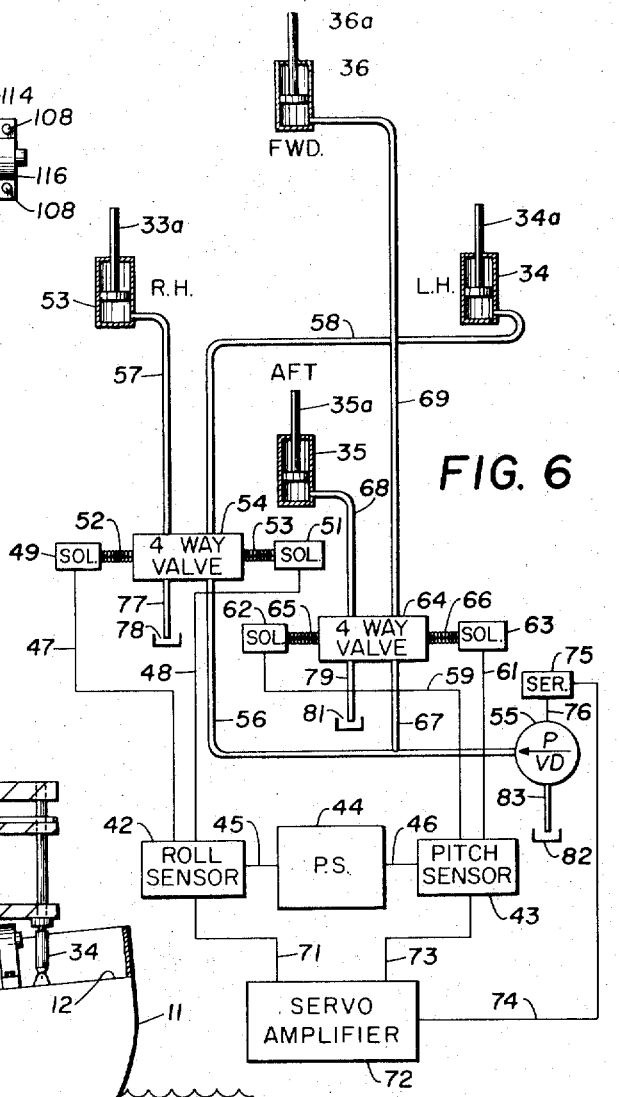
FIGURE 6 is a schematic illustration of the sensing and stabilizing means employed to compensate for pitching and rolling movement of the vessel relative to the drilling apparatus.

The hydraulic cylinder and rod assemblies 33–36 are actuated by means illustrated in FIGURE 6. With reference to FIGURE 6, means are provided for sensing the roll and pitch of vessel 11, and take the form of a roll sensor 42 and a pitch sensor 43. Roll sensor 42 and pitch sensor 43 preferably comprise conventional gyroscopes which are powered by a power source 44 through electrical conductors 45 and 46, respectively. When, under the influence of sea 32, vessel 11 rolls, as illustrated in FIGURE 2, roll sensor 42 will send a signal through either conductor 47 or conductor 48, depending upon the direction of the roll, to solenoids 49 and 51, respectively. Solenoids 49 and 51 control movement of four-way valve 54, which in the relaxed position is centered by springs 52 and 53. Valve 54 is interposed between a variable displacement hydraulic pump 55 and cylinder and rod assemblies 33 and 34. Variable displacement pump 55 communicates through conduit 56 with four-way valve 54, and depending upon the position of valve 54, communicates with cylinder and rod assembly 33 through conduit 57 and with cylinder and rod assembly 34 through conduit 58. Pitch sensor 43, upon sensing pitch of vessel 11, will send a signal through either conductor 59 or conductor 61, depending upon the direction of the pitch, to solenoids 62 and 63, respectively. Solenoids 62 and 63 control four-way valve 64 which in a relaxed position is centered by springs 65 and 66. Four-way valve 64 is interposed between variable displacement pump 55 and cylinder and rod assemblies 35 and 36. Specifically, variable displacement pump 55 will communicate through conduits 56 and 67 with either cylinder and rod assembly 35 through conduit 68 or cylinder and rod assembly 36 through conduit 69, depending upon the position of four-way valve 64.

Roll sensor 42, upon roll of the vessel 11, sends a signal through conductor 71 to servo-amplifier 72, which signal is proportional to the degree of roll. Likewise, pitch sensor 43 sends a signal to servo-amplifier 72 through a conductor 73, which signal is also proportional to the degree of pitch of vessel 11. Servo-amplifier 72, in response to signals through conductors 71 and 73 sends a signal through conductor 74 to servo 75 which through conductor 76 controls the output or variable displacement pump 55. Specifically, the greater the degree of pitch and/or roll, the greater will be the output of pump 55.

Each of the cylinder and rod assemblies 33 and 34 is adapted to discharge hydraulic fluid through conduits 57 and 58, respectively, and four-way valve 54, into conduit 77 which discharges it into an atmospheric fluid tank 78. Similarly, cylinder and rod assemblies 35 and 36 discharge fluid through conduits 68 and 69 and four-way valve 64 into conduit 79 which discharges into an atmospheric storage tank 81. Storage tanks 78 and 81 may conveniently communicate through conduits (not illustrated) with atmospheric tank 82 from which variable displacement pump 55 derives its hydraulic fluid through conduit 83.

Means are also provided for compensating for vertical movement of vessel 11 under the influence of sea 32. One embodiment of such means is illustrated in FIGURE 7, to which reference is here made. In FIGURE 7, hydraulic cylinders 18 and 19 receive a continuous charge of hydraulic fluid from constant displacement hydraulic pump 84 through conduits 85 and 86, respectively. The fluid introduced through conduits 85 and 86 will pass through cylinders 18 and 19 and be discharged through conduits 87 and 88, respectively, where they pass through a valve 89 interposed in conduit 91. Conduit 91 discharges into an atmospheric storage tank 92 which through conduits (not illustrated) may communicate with the atmospheric storage tank 93 from which pump 84 derives its charge through conduit 94.

Operation of valve 89 may be controlled by an accelerometer controller 93 or a weight controller 94. Control of valve 89 by accelerometer controller 93 may be effected by closing switch 95 in conductor 96 to permit a signal from accelerometer controller 93 to control solenoid 97, which in turn controls valve 89 through conductor 98. Alternatively, weight controller 94 may be used to control the amount of hydraulic fluid circulated to cylinders 18 and 19. Specifically, transducer 99 in communication with conduit 85 through conduit 101, will, in response to pressure in conduit 101, send an electrical signal through conductor 102 to weight controller 94. Weight controller 94 compares the signal or voltage from transducer 99 with a programmed signal or voltage, and if a variation exists, sends a signal through switch 103, when closed. The signal passing through switch 103 communicates through conductor 96 with solenoid 97 for controlling valve 89 through conduit 98. Drilling rig 13 may be mounted on vessel 11 by a universal joint-type connection rather than the gimbals arrangement illustrated in FIGURES 1, 2 and 3. For example, and with reference to FIGURE 4, rig 13 has base 23 thereof attached to cradle 104 by bolts 109 or the like. The cradle 104 receives a pin 105 therethrough. Pin 105 is integral with the periphery of an annular collar 106, as illustrated in FIGURE 5. Pin 105 also passes through a cradle 107 attached to deck 12 of vessel 11 by any suitable means, such as bolts 108.

Figure 4:
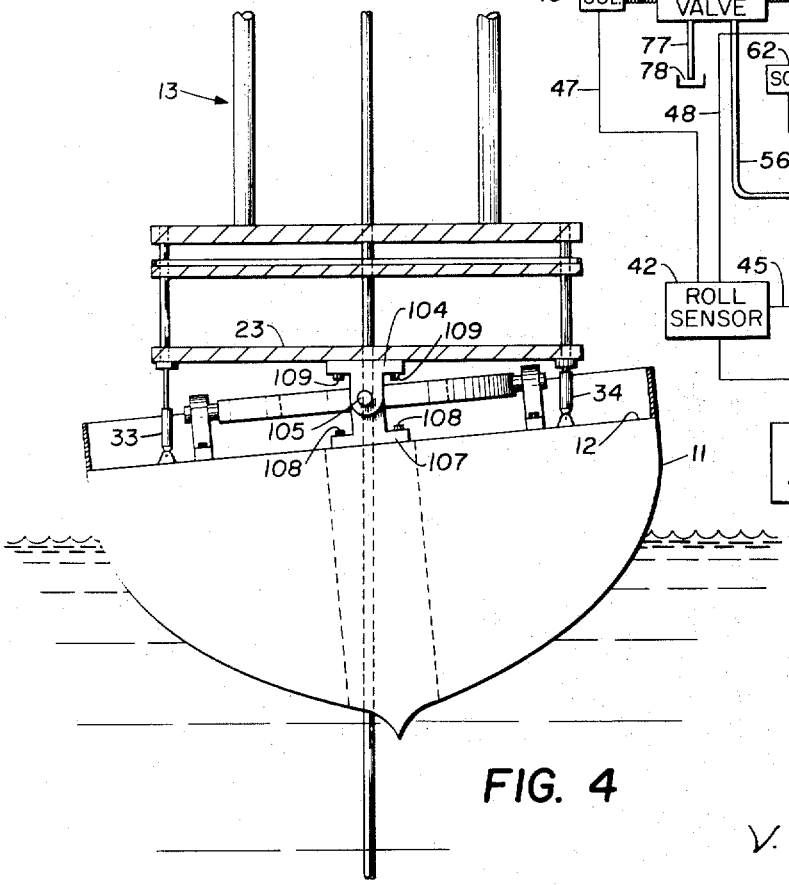
FIGURE 4 is a front elevational view, partially cross sectioned, to illustrate yet another embodiment of the invention with the sensing and stabilizing means omitted for ease of illustration.

Collar 106 is provided with a pin 111 diametrically opposed to pin 105. Pin 111 is rotatably carried within a cradle 112 attached to deck 12 of vessel 11 by suitable means such as bolts 108. The end of pin 111 is also rotatably carried within a crandle attached to base 23 of drilling rig 11, in the same manner that crandle 104 is attached, as illustrated in FIGURE 4. Collar 106 includes another set of diametrically opposed pins 113 and 114 which are received within crandles 115 and 116 attached to deck 12 of vessel 11 by bolts 108. Intermediate the edges of base 23 are disposed hydraulic cylinder and rod assemblies 33–36 in the same manner described in connection with the embodiment illustrated in FIGURE 1. Also, the hydraulic circuitry illustrated in FIGURES 6 and 7 is used with the embodiment illustrated in FIGURE 4.

In operation, when the vessel 11 rolls to the port side, as illustrated in FIGURE 2, roll sensor 42 senses the roll motion and transmits a signal through conductor 48 to actuate solenoid 51 thereby moving four-way valve 54 to admit hydraulic fluid from variable displacement pump 55 into cylinder and rod assembly 33 to extend rod 33a. Simultaneously, actuation of four-way valve will permit discharge of hydraulic fluid from cylinder and rod assembly 34 through conduit 58 and four-way valve 54 into tank 78 through conduit 77. Thus, rolling movement of the vessel to the port side will be compensated for by admitting fluid to cylinder and rod assembly 33 and withdrawing fluid from cylinder and rod assembly 34. Conversely, if the vessel 11 rolls to the starboard side, roll sensor 42 transmits a signal through conductor 47 to actuate solenoid 49 which in turn drives four-way valve 54 to admit fluid from pump 55 into cylinder and rod assembly 34 through conduit 58 for extending rod 34a. Simultaneously, fluid from cylinder and rod assembly 33 will be permitted to discharge through four-way valve 54 and conduit 77 into tank 78. Roll sensor 42, in addition to transmitting a signal through either conductor 47 or 48, transmits a signal through conductor 71 to servo-amplifier 72. The signal to servo-amplifier 72 is proportional to the degree of roll of vessel 11 from the horizontal, and servo-amplifier 72 through servo 75 will control the rate at which variable displacement pump 55 discharges hydraulic fluid into either cylinder and rod assembly 33 or cylinder and rod assembly 34.

If the bow of the vessel moves downward, e.g. the vessel pitches forward, pitch sensor 43 will send a signal through conductor 61 to actuate solenoid 63. Solenoid 63 moves four-way valve 64 to admit hydraulic fluid from variable displacement pump 55 through conduit 68 into cylinder and rod assembly 35 to extend rod 35a. Actuation of four-way valve 64 by solenoid 63 also opens conduit 69 through to conduit 79 to permit discharge of hydraulic fluid from cylinder and rod assembly 36 into tank 81. Conversely, if the vessel pitches in the reverse direction, i.e. the bow moves upward, pitch sensor 43 transmits a signal through conductor 59 to actuate solenoid 62. Solenoid 62 moves four-way valve 64 to permit fluid to flow from variable displacement pump 55 through four-way valve 64 and conduit 69 into cylinder and rod assembly 36 to extend rod 36a. Actuation of four-way valve by solenoid 62 also permits fluid to flow from cylinder and rod assembly 35 through conduit 68 and four-way valve 64 into tank 81.

A combination of pitch and roll will result in actuation of both roll sensor 42 and pitch sensor 43 causing simultaneous actuation of four-way valves 54 and 64 to compensate for the simultaneous pitching and rolling of vessel 11.

With the embodiment illustrated in FIGURES 1–3, compensation for pitching and rolling movement of vessel 11 is permitted by the gimbal connection between drilling rig 13 and vessel 11. Specially, semi-spherical shell 24 is moveably accommodated with the partitions 26 so that cylinder and rod assemblies 33–36 may freely move rig 13 relative to vessel 11.

The embodiment of FIGURE 4 is similarly freely mounted to permit pitching and rolling of vessel 11 relative to rig 13. In the instance of FIGURE 4, the universal joint-type arrangement permitted by various cradles and collar 106 permits compensation by cylinder and rod assemblies 33–36 for the vessel movement.

The embodiments illustrated also permit compensation for vertical movement of vessel 11. In particular, if vessel 11 is being used to conduct a drilling operation, switch 103 is closed and switch 95 opened. Thus, the weight to be applied to the drill bit used in the drilling operation may be applied by adjustment of weight controller 94. Once a weight is selected, that weight may be maintained by use of weight controller 94. Specifically, if vessel 11 moves upward, greater weight will be placed upon rods 21 and 22 and concomitantly the pressure of hydraulic fluid flowing through cylinders 18 and 19 from constant displacement pump 84 will be increased. The increase in fluid pressure will be sensed by transducer 99 through conduit 101. Transducer 99 transmits a signal through conductor 102 to weight controller 94 which is proportional to the pressure in conduit 101. An increase in the voltage of the signal through conductor 102 will be sensed by weight controller 94. Weight controller 94 in response to the increased voltage signal will actuate solenoid 97 to further open valve 89 thereby increasing fluid flow therethrough. Increased fluid flow through valve 89 will permit rods 21 and 22 to move downward thus compensating for the upward vertical movement of vessel 11. Conversely, a decrease in pressure sensed by transducer 99 will lower the voltage of the signal through conductor 102. Weight controller 94, upon sensing the decrease in voltage below the desired level, will transmit a signal through switch 103 and conductor 96 into solenoid 97 to slightly close valve 89 thus retaining more fluid from constant displacement pump 84 within cylinders 18 and 19 to compensate for the movement of vessel 11. Flow from pump 84 through cylinders 18 and 19 is continuous, and thus only slight movement of valves 89 will effect either upward or downward movement of rods 21 and 22.

In instances where the weight carried by drill string 26 will not appreciably vary, but where vertical movement of vessel 11 can be critical, accelerometer controller 93 may be utilized. For example, in placing a wellhead assembly or a blow-out preventer on the conductor pipe or wellhead at or near the ocean floor, it is necessary to gently position the equipment on the bottom to prevent damage to the equipment or minimize the possibility of injury to personnel who may be working on the bottom to connect the equipment. In these instances, the weight suspended from drill string 26 will not vary appreciably upon vertical movement of vessel 11. Thus, accelerometer controller 93 which senses vertical acceleration of the vessel 11 will be placed into operation by opening switch 103 and closing switch 95. Either upward or downward acceleration of vessel 11 will result in signal generation from accelerometer controller 93 which signal will be transmitted through conductor 96 to solenoid 97 for actuation of valve 89. For example, acceleration of vessel 11 upwardly will result in a signal transmission through conductor 96 which will through solenoid 97 open valve 89 to permit rods 21 and 22 to move downward under the influence of the weight of drill string 26, and downward acceleration of vessel 11 will generate a signal of the opposite polarity causing solenoid 97 to close valve 89 result- ıg in upward movement of rods 21 and 22. With the mbodiments of the invention illustrated in FIGURES –7, it is possible to compensate for pitching and rolling s well as vertical movement of vessel 11 thereby mainaining drilling rig 13 in a vertical position relatively unffected by movements caused by turbulence of the sea 32. Iowever, none of the sensing and stabilizing means will ıterfere with the use of drill head 16 while making hole r making a trip. Thus, while drill head 16 will be in verical motion while making hole or making a trip, the dered vertical motion will not be affected by vertical ıovement of the vessel 11.

Various sensing and stabilizing means may be emloyed. While gyroscopes are preferred for roll and pitch ensors, accelerometers could be substituted. Also, a lumb operated rheostat could be employed. Further, the ansducer used to sense hydraulic pressure changes durıg vertical movement of the rig could be replaced by a rain gauge or the like. Also while hydraulic stabilizing ıeans are illustrated and described, electrical stabilizing ıeans could be utilized. While two hydraulic pumps are lustrated, only one pump either of the constant or varible displacement type may be used if desired.

Additional stabilizing means may be used in combinaon with the sensing and stabilizing means of the present ıvention to prevent horizontal movement of the vessel, desired.

After a reading of the above, it will be noted that the ıvention may be equally useful for stabilizing a floating rane. Specifically, the mast of the illustrated embodiıents may incorporate a crane structure for use in transerring articles between the vessel and another surface ıch as a dock or offshore drilling platform. Since the ıast or crane would be stabilized during pitching, rolling nd vertical movement of the vessel, loads could be asily transferred between the vessel and an adjacent ırface without fear of damaging the transferred object ue to its collision with the surface or another object hen the vessel is moved by action of the sea.

While rather specific terms have been used to describe arious embodiments of the invention, they are not inended, nor should they be construed, as limitations upon ıe invention as defined by the following claims.

What is claimed is:

1. In an offshore apparatus including a vessel which ıpports a mast, the improvement comprising:

means for mounting said mast to said vessel so that said vessel can pitch and roll relative to said mast;

first sensing means for sensing the roll of said vessel and generating an output signal when said vessel rolls relative to a desired level position;

first stabilizing means responsive to the signal from said first sensing means for maintaining said mast in a vertical position during rolling movement of said vessel;

second sensing means for sensing the pitch of said vessel and generating an output signal when said vessel pitches relative to a desired level position; and second stabilizing means responsive to the signal from said second sensing means for maintaining said mast in a vertical position during pitching movement of said vessel.

2. The apparatus of claim 1 wherein said mast is dapted to support a body therefrom and means are proided for raising and lowering said body relative to said ıast, and said apparatus includes:

third sensing means responsive to vertical movement of said vessel for generating a signal upon vertical movement of said vessel from a desired elevation; and third stabilizing means responsive to the signal from said third sensing means for maintaining a body suspended from said mast in a predetermined vertical position upon vertical movement of said vessel.

3. The apparatus of claim 1, wherein said means for mounting said mast to said vessel includes:

a gimbals connection between said mass and said vessel.

4. The apparatus of claim 1, wherein said first sensing and first stabilizing means comprises:

a first gyroscope assembly adapted to transmit a first signal upon roll of the vessel in one direction and a second signal upon roll of the vessel in the opposite direction;

a first hydraulic cylinder and rod assembly positioned to one side of the longitudinal axis of said vessel with one end attached to said mast and the other end attached to said vessel;

a second hydraulic cylinder and rod assembly positioned to the opposite side of the longitudinal axis of said vessel with one end attached to said vessel and the other end attached to said mast;

first pump means for supplying hydraulic fluid to said first and second hydraulic cylinder and rod assemblies; and first valve means interposed between said pump means and said first and second hydraulic cylinder and rod assemblies and in communication with said first gyroscope, said first valve means being responsive to said first and second signals from said first gyroscope means to control fluid flow from said first pump means to said first and second cylinder and rod assemblies for maintaining said mast in a vertical posiiton during rolling movement of said vessel.

5. The apparatus of claim 4, wherein said second sensing and second stabilizing means comprises:

a second gyroscope assembly adapted to transmit a first signal upon pitch of the vessel in one direction and a second signal upon pitch of the vessel in the opposite direction;

a third hydraulic cylinder and rod assembly positioned along the longitudinal axis of said vessel to one side of the centerline of said mast with one end attached to said vessel and the other end attached to said mast;

a fourth hydraulic cylinder and rod assembly positioned along the longitudinal axis of said vessel to the opposite side of the centerline of said mast with one end attached to said vessel and the other end attached to said mast; and second valve means interposed between said first pump means and said third and fourth cylinder and rod assemblies and in communication with said second gyroscope, said second valve means being responsive to said first and second signals from said second gyroscope assembly to control flow from said first pump mean to said third and fourth cylinder and rod assemblies for maintaining said mast in a vertical position during pitching movement of said vessel.

6. The device of claim 5 wherein said mast includes at least one hydraulic cylinder and rod assembly, pump means for supplying hydraulic fluid under pressure to said mast cylinder and rod assembly for raising and lowering of a body suspended from said mast, and [said third sensing and third stabilizing means comprises] *also includes:* a transducer in communication with the hydraulic fluid in said mast cylinder and rod assembly and adapted to transmit a signal proportional to the pressure therein;

a weight controller adapted to compare the signal from said transducer with a predetermined standard and transmit a signal proportional in sign and magnitude to the disparity between the signal from said transducer and the predetermined standard; and valve means interposed between said hydraulic pump and said mast cylinder and rod assembly and responsive to the signal from said weight controller to control the amount of the fluid introduced into said mast cylinder and rod assembly and thereby maintain said body at a predetermined position during vertical movement of said vessel.

[7. The device of claim 1, wherein said third sensing means comprises an accelerometer.]

8. The apparatus of claim 1, wherein said means for mounting said mast to said vessel comprises:

a universal joint having:

a yoke with four pins equally spaced about its outer periphery and an aperture through the center thereof through which a body may be suspended;

a first pair of cradles which are attached to said mast and rotatably receiving therethrough a pair of oppositely spaced yoke pins, and second pair of cradles which are attached to said vessel and rotatably receiving therethrough the remaining oppositely spaced yoke pins.

9. The apparatus of claim 8, wherein said first sensing and first stabilizing means comprises:

a first gyroscope assembly adapted to transmit a first signal upon roll of the vessel in one direction and a second signal upon roll of the vessel in the opposite direction;

a first hydraulic cylinder and rod assembly positioned to one side of the longitudinal axis of said vessel with one end attached to said mast and the other end attached to said vessel;

a second hydraulic cylinder and rod assembly positioned to the opposite side of the longitudinal axis of said vessel with one end attached to said vessel and the other end attached to said mast;

first pump means for supplying hydraulic fluid to said first and second hydraulic cylinder and rod assemblies; and first valve means interposed between said pump means and said first and second hydraulic cylinder and rod assemblies and in communication with said first gyroscope, said first valve means being responsive to said first and second signals from said first gyroscope means to control fluid flow from said first pump means to said first and second cylinder and rod assemblies for maintaining said mast in a vertical position during rolling movement of said vessel.

10. The apparatus of claim 9, wherein said second sensing and second stabilizing means comprises:

a second gyroscope assembly adapted to transmit a first signal upon pitch of the vessel in one direction and a second signal upon pitch of the vessel in the opposite direction;

a third hydraulic cylinder and rod assembly positioned along the longitudinal axis of said vessel to one side of the centerline of said mast with one end attached to said vessel and the other end attached to said mast;

a fourth hydraulic cylinder and rod assembly positioned along the longitudinal axis of said vessel to the opposite side of the centerline of said mast with one end attached to said vessel and the other end attached to said mast; and second valve means interposed between said first pump means and said third and fourth cylinder and rod assemblies and in communication with said second gyroscope, said second valve means being responsive to said first and second signals from said second gyroscope assembly to control flow from said first pump means to said third and fourth cylinder and rod assemblies for maintaining said mast in a vertical position during pitching movement of said vessel.

11. The device of claim 10, wherein said mast includes at least one hydraulic cylinder and rod assembly, pump means for supplying hydraulic fluid under pressure to said mast cylinder and rod assembly for raising and lowering of a body suspended from said mast, and [said third sensing and third stabilizing means comprises] *also includes:* a transducer in communication with the hydraulic fluid in said mast cylinder and rod assembly and adapted to transmit a signal proportional to the pressure therein;

a weight controller adapted to compare the signal from said transducer with a predetermined standard and transmit a signal proportional in sign and magnitude to the disparity between the signal from said transducer and the predetermined standard; and valve means interposed between said hydraulic pump and said mast cylinder and rod assembly and responsive to the signal from said weight controller to control the amount of fluid introduced into said mast cylinder and rod assembly and thereby maintain said body at a predetermined position during vertical movement of said vessel.

*12. In an apparatus for maintaining a body suspended from a floating vessel in a relatively stationary position during vertical movement of the vessel by interposing a hydraulic ram and cylinder assembly between the body and the vessel, one of the members of said assembly being supportable in a fixed position relative to said vessel and the other member of said assembly being fixed relative to said body, an improvement which comprises:*

*means for supplying a hydraulic fluid under pressure to said hydraulic cylinder and ram assembly;*

*transducer means for sensing the weight being supported by said hydraulic cylinder and ram assembly and adapted to transmit a signal proportional thereto;*

*a weight controller adapted to compare the signal from said transducer means with a predetermined standard and transmit a signal proportional to the disparity between the signal from said transducer means and said predetermined standard; and*

*means responsive to the signal from said weight controller for controlling the amount of fluid introduced into and withdrawn from said cylinder and ram assembly for maintaining said body at a predetermined position during vertical movement of said vessel.*

*13. The apparatus of claim 12, wherein said means for controlling the fluid introduced into and withdrawn from said cylinder and ram assembly comprises: valve means interposed between said hydraulic pump and said cylinder and ram assembly, said valve means being responsive to said signal from said weight controller.*

*14. The apparatus of claim 12, wherein the means for sensing the weight comprises: a transducer in communication with the hydraulic fluid in said cylinder and ram assembly.*

References Cited

The following references, cited by the Examiner, are of record in the patented file of this patent or the original patent.

UNITED STATES PATENTS

| | | | |
|---|---|---|---|
| 2,497,065 | 2/1950 | Braddon | 114—191 |
| 3,177,954 | 4/1965 | Rand | 175—7 |
| 3,158,208 | 11/1964 | Kammerer | 175—27 |
| 3,208,728 | 9/1965 | Parks | 175—27 |
| 3,372,584 | 3/1968 | Jageler | 175—7 UX |
| 3,421,581 | 1/1969 | Van Geijn | 175—7 X |

TRYGVE M. BLIX, Primary Examiner

U.S. Cl. X.R.

175—7